May 29, 1934.  A. C. LINDGREN  1,960,270
CULTIVATOR ATTACHMENT FOR TRACTORS
Filed Aug. 17, 1933    2 Sheets-Sheet 1

Inventors
A.C. Lindgren
W.S. Graham
By H.P. Doolittle
Atty.

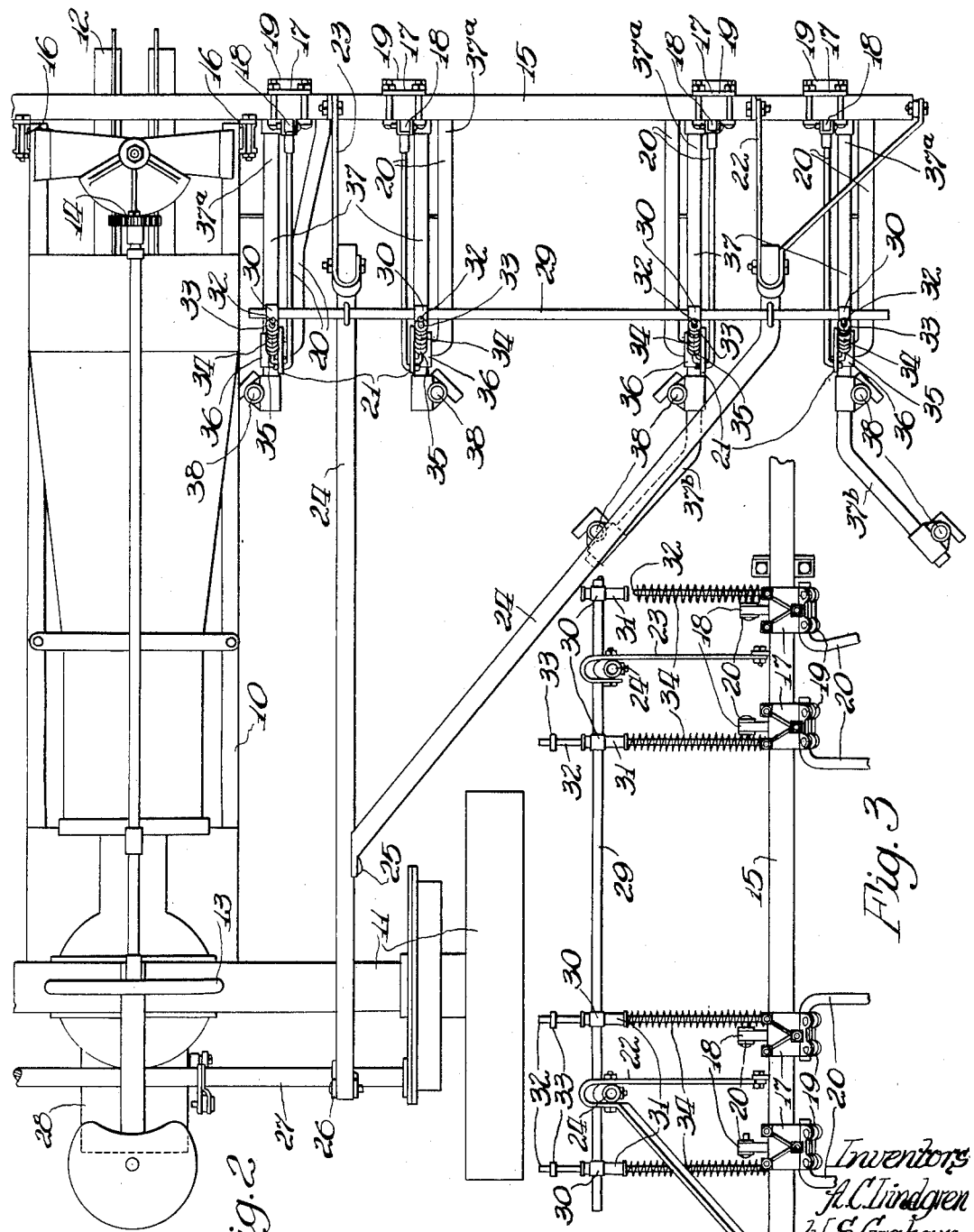

Patented May 29, 1934

1,960,270

UNITED STATES PATENT OFFICE 1,960,270

CULTIVATOR ATTACHMENT FOR TRACTORS

Alexus C. Lindgren, Chicago, and William S. Graham, Canton, Ill., assignors to International Harvester Company, a corporation of New Jersey Application August 17, 1933, Serial No. 685,508

6 Claims. (Cl. 97—47)

The invention relates to tractor cultivator attachments and in particular to the structure and manner of mounting the cultivator units of a multiple row cultivator.

The main objects of the invention are to provide a simplified lift for a plurality of laterally spaced cultivator units, and to provide structure facilitating relative adjustment of the units laterally without altering the relation of the units to the lifting elements. Another object is to provide a simplified and improved cultivator unit of the parallel lift, floating type.

The novel structure by which the foregoing and other objects are attained is more specifically described hereinafter and illustrated in the accompanying drawings, where:

Figure 2 is a partial plan view, one side of the tractor and cultivator attachment being omitted; and, Figure 3 is a detail front view of the attachment.

Figure 1:
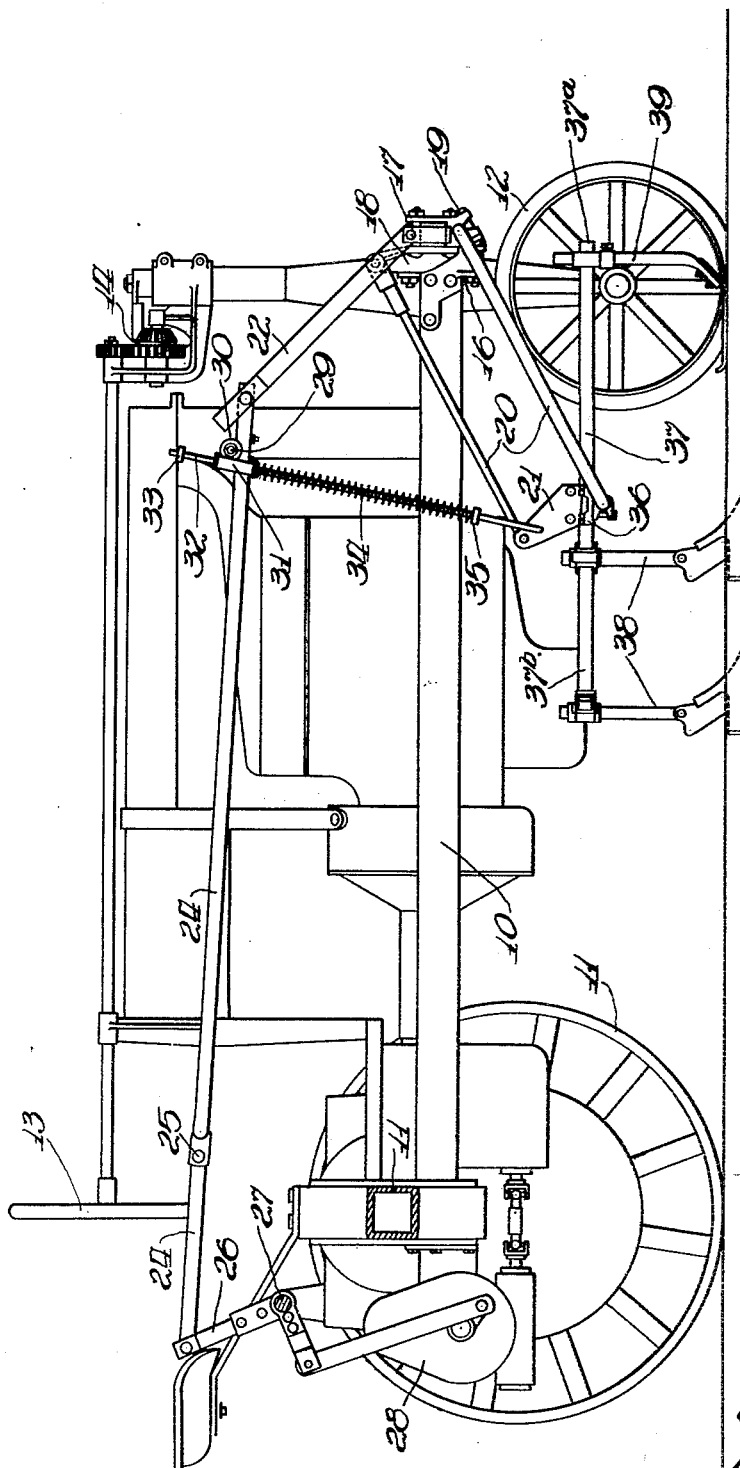
Figure 1 is a side elevation of a tractor with the cultivator attachment of this invention mounted thereon.

The invention is illustrated in connection with a row-crop tractor of the well known tricycle type having a central longitudinally extending body portion 10, the rear axle structure and traction wheels 11, and a narrow dirigible front truck 12 running between the two plant rows, such as corn or cotton, which are straddled by the rear traction wheels. The dirigible truck is actuated from the steering wheel 13 through suitable gearing 14 connecting the wheel and steering shaft to the vertical shaft of the truck. As the tractor is of a well known type, further description thereof is deemed unnecessary.

In the practice of the present invention, a supporting member 15 is mounted across the front end of the tractor by suitable clamps at 16, so as to extend laterally beyond each side of the tractor. In the present instance, the supporting member is shown as extending over the space required for two plant rows at each side of the tractor body. As the structure of the attachment at each side of the tractor is identical, only one half thereof is illustrated on the drawings, and will be described. The supporting member 15 carries a plurality of draft brackets 17 which are clamped thereto for adjustment laterally along the supporting member and are ordinarily arranged in spaced relation corresponding to the row space of the crops to be cultivated. Each draft bracket is formed with an upward extension 18 located above the supporting member 15 and with a downward extension 19 therebelow. Each of these extensions is provided with a transverse opening or bearing in which the forward ends of a pair of superposed, parallel draft links 20 are pivoted for movement vertically. At their rear or lower ends, the draft links 20 are similarly pivoted in the opposite ends of an upright tool bracket 21, thus forming a parallelogram. The supporting member 15 carries a pair of upwardly extending rocker arms 22, 23, which are spaced longitudinally of the member 15, and the upper ends of these arms are pivoted to rearwardly extending thrust bars 24, which are preferably united at their rear ends, as at 25, and connected to an arm 26 on a rockshaft 27 connected to power lift mechanism 28 mounted on the rear of the tractor. The forward ends of the thrust bars 24, which connect with the upper portions of the rocker arms 22, 23, have secured thereon a cross-rod 29 which extends across the space occupied by the cultivator units below it. This rod carries a series of spaced lift brackets 30, which are slidably mounted for lateral adjustment on the rod 29, so that they may be adjusted in conjunction with any similar lateral adjustment that may be given to the draft brackets 17. Each lift bracket 30 is formed with a vertical slide opening or sleeve 31. This sleeve slidably receives the upper portion of a lift rod 32, the lower end of which is pivotally connected to a tool bracket 21. Each lift rod is provided with a stop nut 33 at its upper end to limit its movement through sleeve 31, and each rod is provided with a compression spring 34, which is confined between the lower end of the sleeve 31 and a stop 35 on the lower portion of the lift rod. Each tool bracket 21 is formed with a fore and aft extending clamp socket 36 preferably located between the pivot points of the draft links 20. This socket adjustably receives the middle portion of a longitudinally extending tool bar 37, thereby providing a forwardly extending arm 37a and an angularly directed rear arm 37b for each tool bar. Each pair of these bars, with their rear ends oppositely directed, thus provide for the usual arrangement of straddle row shovel gangs 38 in offset or rearwardly diverging relation, as seen in Figure 2. The forward end of the straight, forwardly extending arm 37a of each tool bar is provided with an adjustable ground engaging depth gauge 39, which may be of the shoe or runner type illustrated.

With the construction above described, it will be seen that each cultivator unit or rig will have a certain amount of free floating movement against the resistance of its pressure spring 34, and that, by reason of the parallel draft links, the vertical movement thereof will be substantially rectilinear. When the lift is actuated to raise the units, forward movement of thrust bars 24 will rock the arms 22, 23, and shift the cross-rod 29 forwardly, causing the sleeves 31 on the lift brackets 30 to engage the stop nuts 33 on the lifting links, and raise all the units simultaneously, the tool bars all being maintained in substantially level or horizontal position. As an important feature of the invention, it will be seen that, when it is desired to alter the spacing between the cultivator units, this can be done by adjusting the draft brackets 17 along with the corresponding lift brackets 30 without altering the operative relation of the cultivating units and of these brackets to the lift mechanism, thus assuring that the lift will operate equally well at all adjustments and apply uniform pressure to the units, when down, through all the springs 34. The unitary tool bars 37 provide a simple form of support for both depth gauge and tools capable of fore and aft adjustment by merely loosening clamp bolts of the sockets 36.

The preferred construction herein specifically described is obviously capable of variation without departure from the scope of the invention as defined in the following claims.

What is claimed is:

1. In a cultivator attachment for tractors, a supporting member adapted to be mounted on a tractor to extend transversely thereof, cultivator units spaced along said member each comprising a tool carrying means pivotally connected to the supporting member for movement vertically, upwardly extending rocker arms pivoted on the supporting member in laterally spaced relation, means for rocking said arms fore and aft, a cross-rod movable with the rocker arms, and a lifting link pivotally connecting each tool carrying means with the cross-rod.

2. In a cultivator attachment for tractors, a supporting member adapted to be mounted on a tractor to extend transversely thereof, cultivator units spaced along said member, each comprising a pair of drag links pivoted at the forward ends on the supporting member in vertically spaced relation and a tool bracket to which the rear ends of said links are pivotally connected, a tool bar carried by each tool bracket, upwardly extending rocker arms pivoted on the supporting member in laterally spaced relation, means for rocking said arms fore and aft, a cross-rod supported on the rocker arms and movable therewith, and a lifting link pivotally connecting each tool bracket with the cross-rod.

3. In a cultivator attachment for tractors, a supporting member adapted to be mounted on a tractor to extend transversely thereof, cultivator units spaced along said member, each comprising a pair of drag links pivoted at the forward ends on the supporting member in vertically spaced relation and a tool bracket to which the rear ends of said links are pivotally connected, a tool bar carried by each tool bracket, upwardly extending rocker arms pivoted on the supporting member in laterally spaced relation, means for rocking said arms fore and aft including thrust bars pivoted at their forward ends to the upper ends of the rocker arms and extending towards the rear of the tractor, a cross-rod secured to the thrust bars adjacent their forward ends, spaced lift brackets mounted on the cross-rod directly above each cultivator unit having vertically directed slide openings therein, and a lifting link mounted in the opening of each bracket for limited sliding movement and pivotally connected to the tool bracket below.

4. In a cultivator attachment for tractors, a supporting member adapted to be mounted on a tractor to extend transversely thereof, cultivator units spaced along said member, each comprising a pair of drag links pivoted at the forward ends on the supporting member in vertically spaced relation and a tool bracket to which the rear ends of said links are pivotally connected, a tool bar carried by each tool bracket, upwardly extending rocker arms pivoted on the supporting member in laterally spaced relation, means for rocking said arms fore and aft including thrust bars pivoted at their forward ends to the upper ends of the rocker arms and extending towards the rear of the tractor, a cross-rod secured to the thrust bars adjacent their forward ends, spaced lift brackets mounted on the cross-rod directly above each cultivator unit including vertically directed sleeve portions, a lifting link mounted in the sleeve portion of each bracket for limited sliding movement, a collar on the lower portion of each link, and a compression spring mounted on each link and confined between said collar and the lower end of the sleeve portion of the lift bracket.

5. In a cultivator attachment for tractors, a supporting member adapted to be mounted on a tractor to extend transversely thereof, cultivator units spaced along said member, each comprising a draft bracket clamped on said member for adjustment laterally, a pair of drag links pivoted at the forward ends on the draft bracket in vertically spaced relation and a tool bracket to which the rear ends of the links are pivotally connected, a tool bar carried by each tool bracket, upwardly extending rocker arms pivoted on the supporting member in laterally spaced relation, means for rocking said arms fore and aft, a cross-rod supported on the upper portions of the rocker arms, spaced lift brackets slidably mounted on the cross-rod directly above each cultivator unit for lateral adjustment in conjunction with the draft brackets, and a lifting link pivotally connecting each tool bracket with a lift bracket.

6. A cultivator unit for tractor cultivators comprising a supporting member adapted to be mounted on a tractor, a draft bracket mounted thereon, parallel drag links pivotally connected to the draft bracket at their forward ends in vertically spaced relation, a tool bracket to which the rear ends of said links are pivotally connected, said tool bracket having a socket extending fore and aft therethrough, a tool bar having its middle portion mounted in said socket for adjustment axially, a ground engaging depth gauge mounted on the forward end of the tool bar, and tillage tools mounted on the tool bar rearwardly of said gauge.

ALEXUS C. LINDGREN.
WILLIAM S. GRAHAM.